US011119967B1

(12) United States Patent
Langner

(10) Patent No.: US 11,119,967 B1
(45) Date of Patent: Sep. 14, 2021

(54) METHODS AND APPARATUS FOR PHY REGISTER ACCESS

(71) Applicant: Aquantia Corporation, Milpitas, CA (US)

(72) Inventor: Paul Langner, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 974 days.

(21) Appl. No.: 15/083,041

(22) Filed: Mar. 28, 2016

Related U.S. Application Data

(60) Provisional application No. 62/139,521, filed on Mar. 27, 2015.

(51) Int. Cl.
*G06F 13/42* (2006.01)
*G06F 13/16* (2006.01)

(52) U.S. Cl.
CPC ...... *G06F 13/4282* (2013.01); *G06F 13/1689* (2013.01)

(58) Field of Classification Search
CPC .......... G06F 13/4282; G06F 13/1689
USPC ............ 710/62, 106, 306, 15, 16; 370/463
See application file for complete search history.

(56) References Cited

U.S. PATENT DOCUMENTS

| 8,659,986 B1 | 2/2014 | Martinson et al. | |
| 2005/0013319 A1* | 1/2005 | Kenkare | H04L 12/66 370/463 |
| 2005/0015535 A1* | 1/2005 | Lindsay | H04L 12/40032 710/306 |
| 2014/0207981 A1* | 7/2014 | Baker | G06F 13/385 710/62 |

* cited by examiner

*Primary Examiner* — Idriss N Alrobaye
*Assistant Examiner* — Henry W Yu

(57) ABSTRACT

A system including an Ethernet transceiver PHY and a network device is disclosed. The Ethernet transceiver PHY includes register circuitry to store information associated with operating characteristics of the PHY. The network device couples to the Ethernet transceiver PHY in a closed system architecture and includes a system processor and an MDIO interface. The MDIO interface interacts with the PHY register circuitry during a normal operating mode. The system includes system interface circuitry to receive requests for accessing the register circuitry in a debug operating mode. The requests are generated external to the closed system architecture.

20 Claims, 4 Drawing Sheets

METHODS AND APPARATUS FOR PHY REGISTER ACCESS

RELATED APPLICATIONS

This application claims the benefit of priority under 35 U.S.C. 119(e) to Provisional Application No. 62/139,521, filed Mar. 27, 2015, entitled METHODS AND APPARATUS FOR PHY REGISTER ACCESS, and is expressly incorporated by reference herein.

TECHNICAL FIELD

The disclosure herein relates generally to electronic communications, and more particularly to high-speed Ethernet systems and methods.

BACKGROUND

Ethernet transceiver physical layer circuits, or "PHYs", transmit and receive data over physical media, such as copper cables. High-speed Ethernet PHYs generally provide complex analog and digital circuitry to carry out various signal processing operations to implement physical layer functions. Various register circuits disposed within a PHY generally stores status information associated with operation of the PHY, and other information such as filter coefficient values, signal-to-noise ratio (SNR), bit error rates (BER), and so forth. Accessing such information can provide a user with a wealth of information concerning the operation of the PHY.

With the increase in PHY complexity, efficiently debugging problematic PHY's becomes an important issue. Conventionally, PHY status information could be retrieved via an ASCII terminal emulation provided as a tool in a network device's system software. This method of access is very slow in that manual query and response commands are hand-typed and received. Further, in situations where the problematic PHY is located in a remote location, manual debugging via the ASCII terminal tool is not cost effective.

Another problem involved in debugging the PHY involves the "closed system" architecture of many network devices, which exclude any third-party access to the system. Thus, methods and apparatus are needed to provide PHY register access in a variety of situations that are efficient and more cost effective.

DETAILED DESCRIPTION

Embodiments of methods of Ethernet systems, methods and apparatus are disclosed. In one embodiment, a system including an Ethernet transceiver PHY and a network device is disclosed. The Ethernet transceiver PHY includes register circuitry to store information associated with operating characteristics of the PHY. The network device couples to the Ethernet transceiver PHY in a closed system architecture and includes a system processor and an MDIO interface. The MDIO interface interacts with the PHY register circuitry during a normal operating mode. The system includes system interface circuitry to receive requests for accessing the register circuitry in a debug operating mode. The requests are generated external to the closed system architecture. Enabling externally-generated requests to access the PHY register circuitry provides significant efficiency and cost benefits in debugging Ethernet links.

Figure 1:
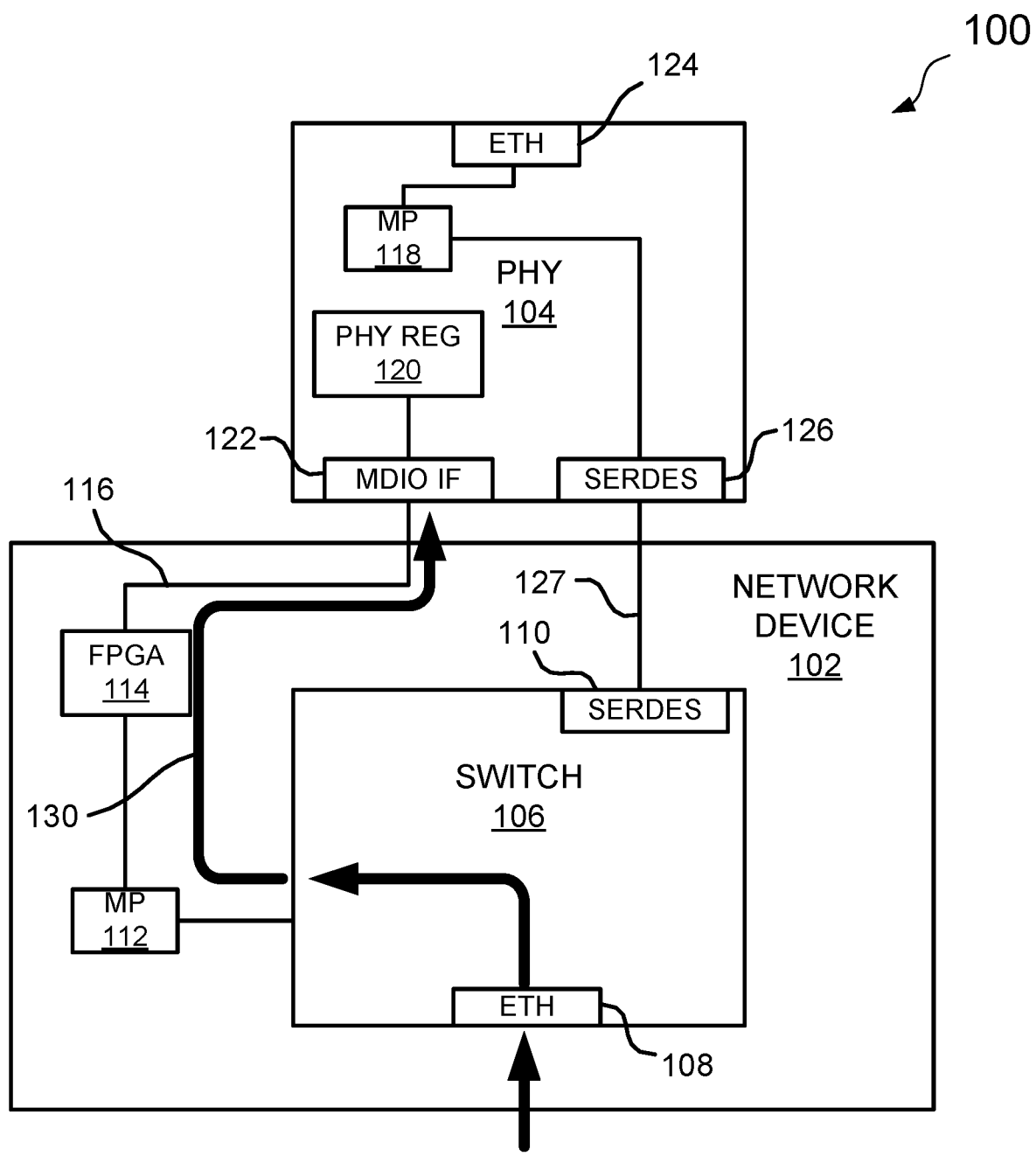
FIG. 1 illustrates a block diagram of one embodiment of a "closed system" that provides PHY register access via system processor packet messaging.

FIG. 1 illustrates one embodiment of a system, generally designated 100, that includes a network device 102 and an Ethernet transceiver PHY 104. The network device may take several forms, such as a network access point, a router, gateway, and so forth. For one embodiment, the system takes on a closed architecture that generally inhibits third party software access to the system.

Further referring to FIG. 1, the network device 102 generally includes a switch 106 that employs an Ethernet port 108. Software associated with the network device selectively opens the Ethernet port for access to the network device via Ethernet packet messages. As described below, the Ethernet port allows for the Ethernet packet messages to be received by the closed system to carry out certain PHY debugging tasks. The switch 106 also includes a system-side (from the perspective of the PHY 104) serial port 110 with a Serializer Deserializer (SERDES) link to transfer data between the switch 106 and the PHY 104. The switch interfaces with a system microprocessor 112, which manages operation of the network device 102. Logic, in the form of a field-programmable gate array (FPGA) 114 cooperates with the processor to, in a normal operating mode, pass control and status information to the PHY 104 along a Management Data Input/Output (MDIO) link 116. The MDIO link is a high-speed serial link capable of transferring status and control information at very high speeds.

With continued reference to FIG. 1, one embodiment of the Ethernet transceiver PHY 104 includes a PHY microprocessor 118 and PHY register circuitry 120. The PHY register circuitry 120 stores status and other control information pertaining to various PHY operating parameters. The information may include filter coefficients, power back off values, signal-to-noise ratio (SNR), bit error rate (BER), and so forth. During normal operation, the PHY register circuitry 120 is accessed via an MDIO port 122. The PHY additionally includes an Ethernet line interface 124 for transferring data with a link partner, and a system-side SERDES interface 126 for transferring serial data with the network device switch 106 via a SERDES link 127.

In a normal mode of operation, the PHY register circuitry 120 is generally accessible to the network device processor 112 via the MDIO link 116. While this is useful to the system in general, the closed nature of the architecture renders it difficult to obtain the status information by a third party.

In some instances, a given Ethernet link associated with the system 100 may experience problems during normal operation. As noted above, status information reflecting the state of various PHY operating parameters is stored in the PHY register circuitry 120. Thus, having external access to the status and control information that's stored in the PHY is critical to successfully debugging PHYs that exhibit problems during operation.

In one embodiment, a second mode of operation enables access to the PHY register circuitry 120 via Ethernet packet messages generated external to the closed system 100. The information flow is shown by the bold arrows at 130. Software associated with the switch 106 selectively opens the Ethernet port 108 to receive the packet requests, which include MDIO read/write commands embedded in packet data payload fields. The packet data payload fields may indicate, for example, an MDIO command type (i.e. read or write request), MDIO address and data (if a write or read response), and a sequence number to associate read responses with requests. The packet messaging scheme may also involve detecting, assigning, or associating media access control (MAC) addresses and TCP port numbers with a given Ethernet transceiver PHY.

Further referring to FIG. 1, as explained above, in some embodiments, the Ethernet packet messages are generated external to the system 100, such as through a remote device via the Internet, and delivered to the port via a secure means for delivery (which may also acknowledge receipt), such as a transmission control protocol (TCP) port. The received packet information is then passed to the system microprocessor 112 and programmable logic 114, such that the MDIO requests are stripped from the packets and transferred to the PHY via the MDIO link 116. The PHY register circuitry may then be accessed in response to read/write commands to obtain the stored status information. The information read from the register circuitry may then be returned along a similar path, packaged into Ethernet data payload fields, and transferred back to the remote requestor via the same external Ethernet path that the requests for access were delivered.

Figure 2:
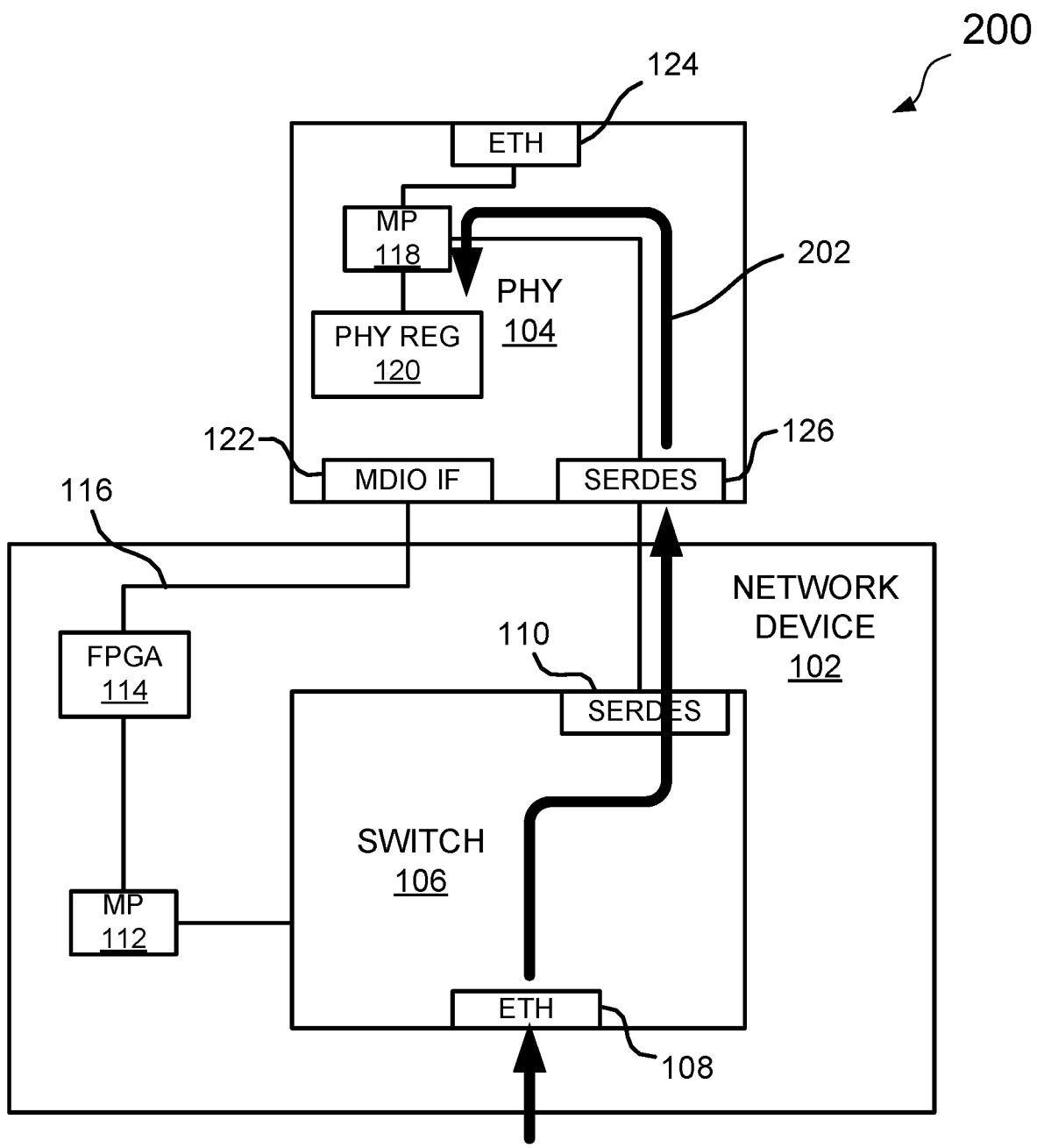
FIG. 2 illustrates a block diagram of a "closed system" similar to FIG. 1, that provides PHY register access via in-band system-side packet messaging.

FIG. 2 illustrates a system, generally designated 200, that is similar to the system of FIG. 1, but operates to access the PHY register circuitry 120 is a different manner than via the PHY MDIO interface 122. Instead of transferring the read/write commands through the high-speed MDIO interface, as is carried out in the embodiment of FIG. 1, commands that are received by the switch 106 embedded in received Ethernet packet messages are communicated to the PHY via the system-side SERDES link 127. The PHY processor 118 is responsive to the received read/write requests to intercept and inject MAC addresses and other associated status and control information intended for the PHY register circuitry 120. Note that this method involves embedding the register requests in a user's data stream. The request flow is shown by the bold arrows at 202.

Figure 3:
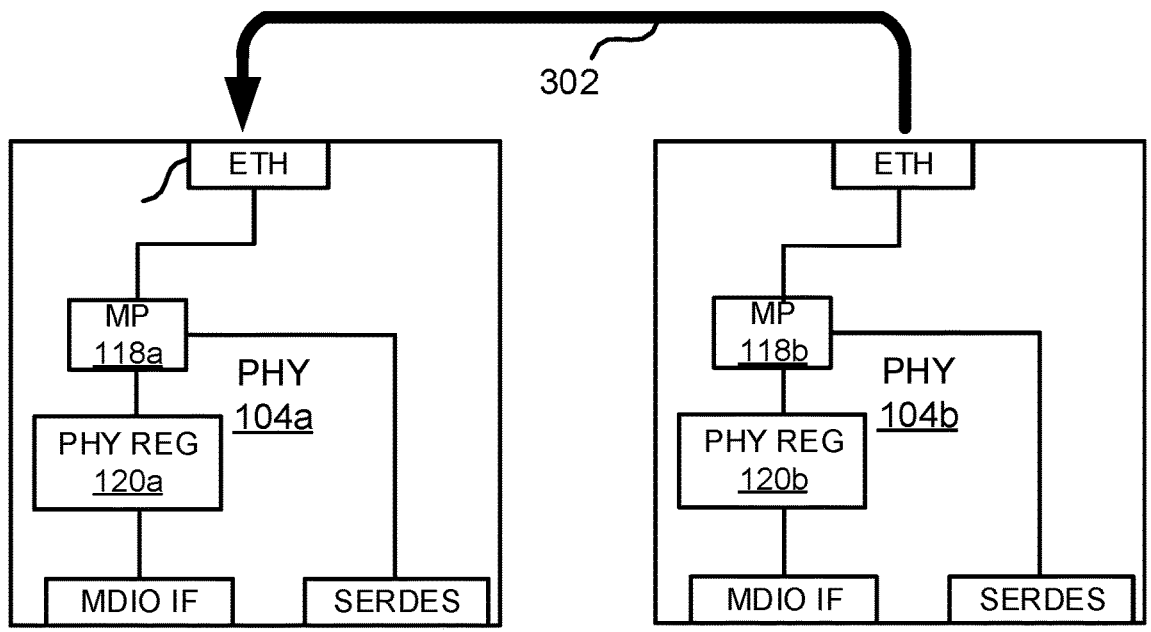
FIG. 3 illustrates a block diagram of one embodiment of a PHY that provides PHY register access via in-band line-side packet messaging between link partner PHYs.

A further Ethernet packet-based approach to accessing a PHY register is shown in FIG. 3. PHY register circuitry 120a in a first Ethernet transceiver PHY 104a may be accessed via a line-side Ethernet link 302 established by, for example, a second Ethernet transceiver PHY 104b. Similar to the embodiment shown in FIG. 2, access commands may be embedded in Ethernet packet messages and transferred from the second PHY 104b to the first PHY 104a. The PHY processor 118a is responsive to the received read/write requests to intercept and inject MAC addresses and other associated status and control information intended for the PHY register circuitry 120a. Like the system-side packet message approach of FIG. 2, the line-side packet messaging approach also involves embedding the register requests in a user's data stream, an in-band form of communication between the PHYs.

Figure 4:
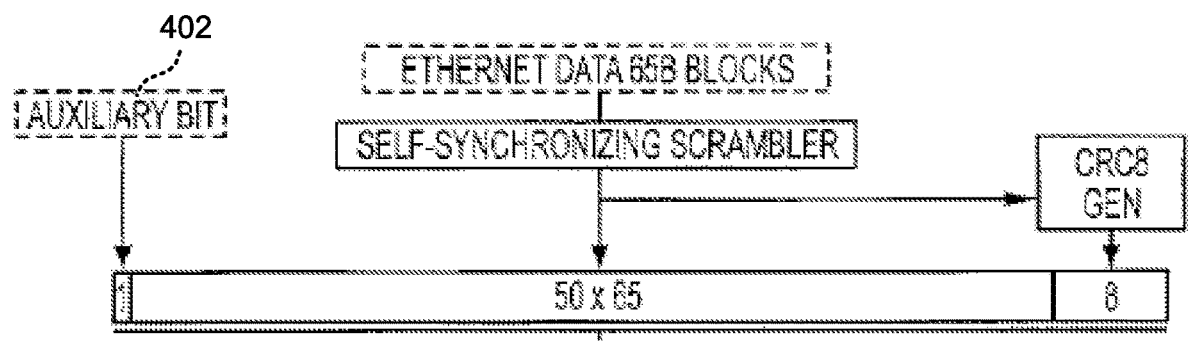
FIG. 4 illustrates one embodiment of an Ethernet transport frame that includes an auxiliary bit used for out-of-band packet messaging between link partner PHYs, similar to the the method of FIG. 3.

In an effort to avoid embedding access requests in a user's data stream (packet payload), one embodiment employs an out-of-band form of communication while utilizing the circuit configuration of FIG. 3. The out-of-band communication takes advantage of unused bits employed in an Ethernet transport frame to pass the read/write access commands. FIG. 4 illustrates one exemplary transport frame employed by the 10GBASE-T Ethernet standard, with an unused auxiliary bit, at 402, that may be used as an auxiliary channel to pass the out-of-band command information without affecting a user's data stream.

Figure 5:
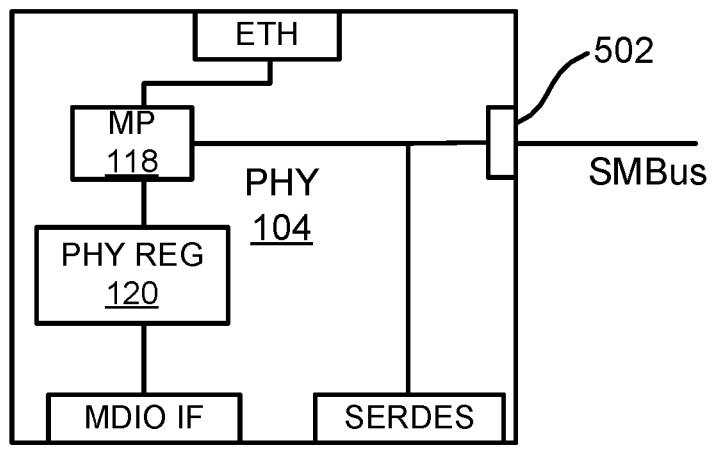
FIG. 5 illustrates a block diagram of one embodiment of an Ethernet PHY that employs a System Management Bus (SMBus) for providing PHY register access.

The PHY register access methods described above generally involve access via standardized PHY interfaces (MDIO, line-side interface, system-side interface). FIG. 5 illustrates one embodiment of an Ethernet PHY that employs an additional SMBus interface, at 502, to enable access of the PHY register circuitry 120. The SMBus is a low-speed serial interface that includes a dedicated port involving a three-pin header. Access to the bus involves establishing a connection to the three-pin header, which thereupon provides a way to access the PHY register circuitry.

Figure 6:
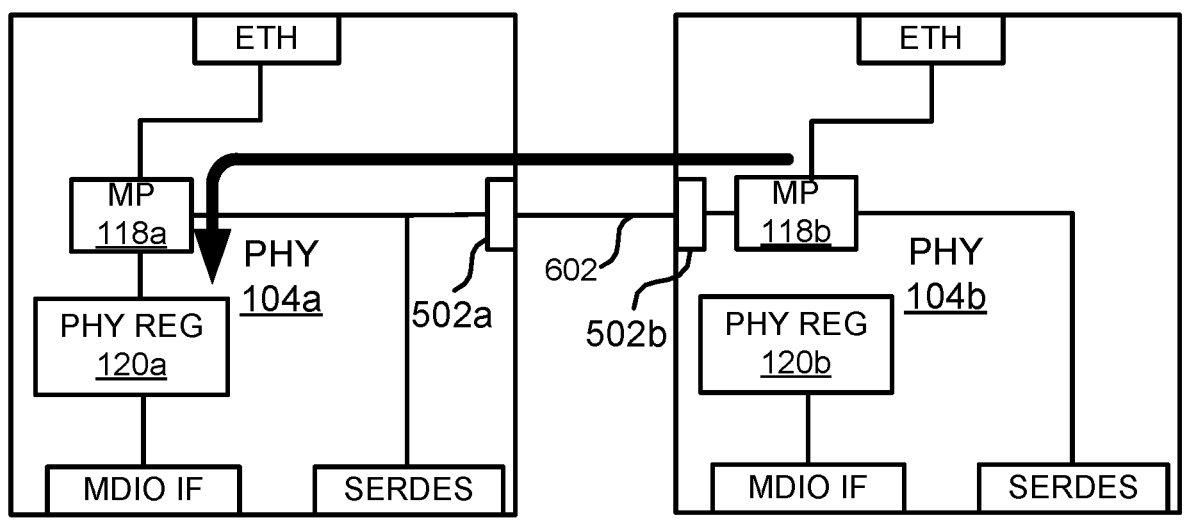
FIG. 6 illustrates a block diagram of one embodiment of an Ethernet PHY, similar to FIG. 5, that employs an SMBus between adjacent Ethernet PHYs to provide PHY register access.

For embodiments involving multi-port Ethernet systems, that may include multiple Ethernet transceiver PHYs in close proximity to one another, an SMBus may provide a useful low-speed communication link 602 between PHYs 104a and 104b, as shown in FIG. 6. A processor 118b from a second Ethernet transceiver PHY 104b may pass access messages via the SMBus 602 to the second Ethernet transceiver PHY 104a, and thereby gaining access to the PHY register circuitry 120a. This embodiment may be especially useful in scenarios where one or more of the standard PHY interfaces are damaged.

Those having skill in the art will appreciate the many benefits and advantages afforded by the embodiments presented herein. Of significant benefit is the ability to access a given Ethernet transceiver PHY via requests generated external to a closed system. This allows for troubleshooting and debugging an Ethernet transceiver PHY from a remote location, and reducing debug costs.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be metal oxide semiconductor (MOS) technology, bipolar technology or any other technology in which logical and analog circuits may be implemented.

With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the suffix symbol "*" attached to signal names indicates that the signal is an active low signal (i.e., the asserted state is a logic low state). A line over a signal name (e.g., ' ') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A system comprising:
   an Ethernet transceiver PHY including register circuitry to store information associated with operating characteristics of the PHY;
   a network device coupled to the Ethernet transceiver PHY in a closed system architecture, the network device including
      a system processor, and
      an MDIO interface for interfacing with the PHY register circuitry during a normal operating mode; and
   wherein the system includes system interface circuitry to receive requests for accessing the register circuitry in a debug operating mode, the requests generated external to the closed system architecture.

2. The system of claim 1, wherein the requests are in the form of Ethernet packet messages that include register read/write commands.

3. The system of claim 2, wherein the network device includes an Ethernet interface, and the register read/write commands in the Ethernet packet messages are received at the Ethernet interface and routed to the Ethernet transceiver PHY.

4. The system of claim 3, wherein the register read/write commands are routed to the Ethernet transceiver PHY via the MDIO interface.

5. The system of claim 3, wherein the PHY further includes a system-side SERDES interface, and the register read/write commands are routed to the Ethernet transceiver PHY via the system-side SERDES interface.

6. The system of claim 1, wherein the PHY further includes a system management bus (SMBus), and the register read/write commands are routed to the Ethernet transceiver PHY via the SMBus.

7. The system of claim 6, wherein the PHY further includes a system processor, and the register read/write commands are routed to the system processor via the SMBus, wherein the SMBus is for coupling to a second Ethernet transceiver PHY.

8. The system of claim 3, wherein the Ethernet interface comprises a line-side Ethernet interface, and the register read/write commands are routed to the Ethernet transceiver PHY via the line-side Ethernet interface.

9. The system of claim 8, wherein the register read/write commands are coded via an auxiliary channel associated with the Ethernet packet messages.

10. The system of claim 9, wherein the auxiliary channel comprises an out-of-band auxiliary field included in the Ethernet packet messages.

11. The system of claim 8, wherein the register read/write commands are included in an Ethernet packet data payload field.

12. A method of operating an Ethernet transceiver PHY in a closed system architecture, the Ethernet transceiver PHY including register circuitry to store information associated with operating characteristics of the PHY, the method comprising:
   generating requests for accessing the register circuitry in a debug operating mode, the generating requests performed external to the closed system architecture;
   transferring the requests to an interface associated with the closed system architecture;
   interfacing with the Ethernet transceiver PHY; and
   accessing the register circuitry to carry out the requests.

13. The method of claim 12, wherein generating requests comprises embedding register read/write commands into Ethernet packet messages.

14. The method of claim 13, wherein the transferring of the requests is carried out at least in part via the Internet.

15. The method of claim 14, wherein the interfacing with the Ethernet transceiver PHY is carried out via an MDIO port.

16. The method of claim 14, wherein the interfacing with the Ethernet transceiver PHY is carried out via a system-side SERDES port.

17. The method of claim 14, wherein the interfacing with the Ethernet transceiver PHY is carried out via a line-side Ethernet port.

18. The method of claim 14, wherein the interfacing with the Ethernet transceiver PHY is carried out via an SMBus port.

19. An Ethernet transceiver PHY comprising:
   register circuitry to store information associated with operating characteristics of the Ethernet transceiver PHY;
   an MDIO interface for interfacing with a network device during a normal operating mode to form at least a portion of a closed system architecture; and
   an SMBus interface for coupling to an SMBus link during a debug mode, the SMBus interface coupled to the register circuitry and configured to receive requests for accessing the resister circuitry during the debug mode, the requests generated external to the closed system architecture.

20. The Ethernet transceiver PHY of claim 19, wherein:
the SMBus interface is to couple to a second SMBus interface of a second Ethernet transceiver PHY via the SMBus link.

\* \* \* \* \*